(12) United States Patent
Kim et al.

(10) Patent No.: US 12,030,370 B2
(45) Date of Patent: Jul. 9, 2024

(54) HOOK ASSEMBLY FOR DOOR CURTAIN OF VEHICLE

(71) Applicants: HYUNDAI MOTOR COMPANY, Seoul (KR); KIA CORPORATION, Seoul (KR); NIFCO KOREA INC., Asan-si (KR)

(72) Inventors: Do-Won Kim, Seoul (KR); Jong-Woo Shim, Suwon-si (KR); Min-Jung Kim, Suwon-si (KR); Yoo-Sung Doh, Asan-si (KR)

(73) Assignees: HYUNDAI MOTOR COMPANY, Seoul (KR); KIA CORPORATION, Seoul (KR); NIFCO KOREA INC, Asan-si (KR)

( * ) Notice: Subject to any disclaimer, the term of this patent is extended or adjusted under 35 U.S.C. 154(b) by 392 days.

(21) Appl. No.: 17/571,673

(22) Filed: Jan. 10, 2022

(65) Prior Publication Data

US 2023/0069762 A1  Mar. 2, 2023

(30) Foreign Application Priority Data

Aug. 31, 2021  (KR) .................. 10-2021-0115519

(51) Int. Cl.
*B60J 1/20* (2006.01)
*B60J 3/00* (2006.01)
*F16B 19/10* (2006.01)

(52) U.S. Cl.
CPC .......... *B60J 1/2047* (2013.01); *B60J 1/2063* (2013.01); *B60J 1/2086* (2013.01); *B60J 3/005* (2013.01); *F16B 19/1081* (2013.01)

(58) Field of Classification Search
CPC ...... B60J 1/2047; B60J 1/2063; B60J 1/2086; B60J 3/005; B60J 5/0401; F16B 19/1081; F16B 45/00; F16B 21/08; F16B 21/125; F16B 21/082; F16B 21/183; F16B 21/10; B60Y 2304/07
See application file for complete search history.

(56) References Cited

U.S. PATENT DOCUMENTS 2,502,539 A * 4/1950 Tinnerman .............. E05C 3/042
   24/663
2,775,154 A * 12/1956 Leaphart, Sr. .......... F16B 21/10
   411/341

(Continued)

FOREIGN PATENT DOCUMENTS

JP         2007261311 A  * 10/2007
KR         10-1404959 B1    6/2014
KR      10-2020-0092142 A    8/2020

*Primary Examiner* — Kimberly T Wood
(74) *Attorney, Agent, or Firm* — Morgan, Lewis & Bockius LLP

(57) ABSTRACT

This application relates to a hook assembly for a door curtain of a vehicle. The hook assembly is installed on a door panel to which a door curtain is hooked and fixed. The hook assembly includes a hook body installed to pass through a through-hole formed in the door panel in a load direction due to the door curtain, and a hook pin engaged with the hook body in a direction perpendicular to the load direction due to the door curtain. When the hook pin is engaged with the hook body, the hook body is supported in the through-hole in an engaged direction of the hook pin and one side of the hook body is pressed against a circumference of the through-hole.

17 Claims, 21 Drawing Sheets

(56) References Cited

U.S. PATENT DOCUMENTS

| | | | | |
|---|---|---|---|---|
| 2,858,725 | A | * | 11/1958 | Thompson ............ F16B 21/125 411/356 |
| 2,997,909 | A | * | 8/1961 | Ames .................... B62D 53/10 411/342 |
| 3,861,267 | A | * | 1/1975 | Collister ............... F16B 41/002 411/345 |
| 8,579,010 | B2 | * | 11/2013 | Medlar .................. B60J 1/2047 160/370.21 |
| 2020/0238796 | A1 | | 7/2020 | Kim et al. |

* cited by examiner

HOOK ASSEMBLY FOR DOOR CURTAIN OF VEHICLE

CROSS-REFERENCE TO RELATED APPLICATION

This application is based on and claims the benefit of priority to Korean Patent Application No. 10-2021-0115519 filed on Aug. 31, 2021, the entire contents of which are incorporated herein by reference.

TECHNICAL FIELD

Exemplary embodiments of the present disclosure relate to a hook assembly for a door curtain of a vehicle. The hook assembly is configured to fix the door curtain installed on a door of the vehicle. In some embodiments, the hook assembly is easily assembled, has a uniform engagement force, and increases an engagement force to prevent separation or breakage during use.

BACKGROUND

A door glass is installed on a door 120 of a vehicle, and a door curtain 122 is installed to cover the door glass. For example, see FIG. 1.

The door curtain 122 is used to control lighting or protect the privacy of passengers. When the door curtain 122 is drawn out from the door 120, an upper end of the door curtain 122 is hooked and fixed to the door 120, thereby maintaining a deployed state. The door curtain 122 is fixed such that a shade bar 122a installed on the upper end of the door curtain 122 is hooked to a hook assembly 110 installed on a door panel 121.

The hook assembly 110 includes a hook body 111 to which the door curtain 122 is fixed, and a hook pin 112 fixed to the door panel 121 of the door 120 and engaged with the hook body 111. The hook pin 112 is fixed to the door panel 121 through a base 112a and a gripping part 112b which are formed on the hook pin 112. In the hook body 111, an engagement part 111d is formed to extend upward from the base 111a and the base 111a, and a curtain fixing part 111b to which the door curtain 122 is fixed is formed below the base 111a. In a state in which the hook pin 112 is fixed to the door panel 121, the hook body 111 is pushed upward from a lower side of the hook pin 112 to be tentatively engaged therewith (see FIG. 3A). In the tentative engagement state, an upper portion of the engagement part 111d is in a state of being inserted into the gripping part 112b, and a lower portion of the engagement part 111d is in a state before being inserted into the gripping part 112b. Like a line L, the gripping part 112b is maintained in a state of being perpendicular to the base 112a of the hook pin 112.

Then, when the engagement of the hook body 111 is completed (see FIG. 3B), the engagement part 111d is inserted into the gripping part 112b, and a coupling part 111c of the hook body 111 is coupled to a coupling part 112c of the hook pin 112. The gripping part 112b is spread outward at an angle α or β (see a line L') so that the hook pin 112 is fixed without being separated from the door panel 121.

However, in the hook assembly 110 according to the related art, according to a size of a through-hole formed in the door panel 121 and a thickness distribution of the door panel 121, an engagement force for engaging the hook pin 112 with the door panel 121 becomes non-uniform.

In addition, since the hook body 111 should be engaged upward enough to spread the gripping part 112b, the engagement force is excessively required so that there is a difficulty in assembling the hook assembly 110.

In addition, in the hook pin 112, although the engagement force and a load (a force for allowing the door curtain 122 to be wound into the door 120) are exerted in opposite directions, both the engagement force and the load are applied in a vertical direction of the vehicle. Accordingly, when the engagement force and the load are simultaneously applied, a situation where the hook assembly 110 is pulled out from the door panel 121 or the hook assembly 110 is damaged occurs.

SUMMARY

An embodiment of the present disclosure is directed to a hook assembly for a door curtain of a vehicle, the hook assembly separates an engagement direction from a direction in which a load is applied in different directions to improve assembly.

Another embodiment of the present disclosure is directed to a hook assembly for a door curtain of a vehicle, the hook assembly is capable of being assembled to a door panel with a constant engagement force, even when a distribution occurs in a size of a through-hole which is formed in the door panel and with which a hook body is engaged.

Other objects and advantages of the present disclosure may be understood by the following description and become apparent with reference to the embodiments of the present disclosure. Also, it is be clear to those skilled in the art to which the present disclosure pertains that the objects and advantages of the present disclosure may be realized by the means as claimed and combinations thereof.

In accordance with an embodiment of the present disclosure, there is provided a hook assembly for a door curtain of a vehicle, which may be installed on a door panel, to which a door curtain is hooked and fixed, and which may include a hook body to be installed to pass through a through-hole formed in the door panel in a load direction in which the door curtain is applied, and a hook pin to engage the hook body in an engagement direction that is perpendicular to the load direction. When the hook pin is engaged with the hook body, the hook body may be supported in the through-hole in an engaged direction of the hook pin and one side of the hook body may be pressed against a circumference of the through-hole.

The hook body may include a base to come into contact with a bottom surface of the door panel, an extension part formed upward from the base to come into contact with an inner circumference of the through-hole when the engagement of the hook pin is completed, an engagement part on an upper portion of the extension part and of which a lower circumference may be hooked to a circumference of the through-hole in the door panel when the engagement of the hook pin is completed to prevent the hook body from being separated from the door panel, and an elastic part extending from the extension in a direction opposite the engagement direction and which has a rear end to support the hook body in the engagement direction.

The engagement part may have a width that tapers in the engagement direction, and the extension part has a side surface that may come into contact with a side contact surface on a side surface of the through-hole.

An outer surface of the extension part may be inclined at a predetermined angle with respect to the engagement direction.

The rear end of the elastic part may include an elastic support to come into contact with a rear contact surface of the through-hole when the engagement of the hook pin with the hook body is completed.

The elastic support may be an inclined surface to support the hook body to be moved toward a front contact surface of the through-hole at a front end of the extension part.

Until an outer surface of the extension part comes into contact with a side contact surface formed on a side surface of the through-hole, the elastic support may elastically support the hook body to allow the front end of the extension part to be moved toward a front contact surface of the through-hole.

The hook pin may include a press part to engage the hook pin with the hook body, a slider extending from the press part in the engagement direction and inserted into a hook pin accommodation groove in the hook body, and a fixing support extending for a predetermined length from a front end of the slider toward the press part to support a bottom surface of the elastic part when the hook pin is engaged with the hook body.

The elastic part may include a fixing bump on the bottom surface of the elastic part to prevent the hook pin from being moved rearward so as to prevent the hook pin from being separated when the hook pin is engaged with the hook body.

The slider may include a stopper on a front end of the slider to be hooked and fixed to the hook pin when the hook pin is engaged with the hook body.

The fixing bump may include an inclined surface to allow the stopper to pass therethrough when the hook pin is engaged with the hook body, and a stop surface to prevent a rearward movement of the hook pin after the hook pin is engaged with the hook body.

The fixing support may include a support block on a rear end of the fixing support to support the bottom surface of the elastic part when the engagement of the hook pin with the hook body is completed, the hook body may include a support block accommodation groove on an inner surface of the base in the hook body to accommodate the support block, the support block may be accommodated in the support block accommodation groove until the engagement of the hook pin with the hook body is completed, and when the engagement of the hook pin with the hook body is completed, the support block may be separated from the support block accommodation groove to support the bottom surface of the elastic part.

When the engagement of the hook pin with the hook body is completed, a bottom surface of the support block may be supported on a bottom surface of the hook pin accommodation groove.

The hook pin accommodation groove may include a hook pin support groove at an entrance of the hook pin accommodation groove to support the bottom surface of the hook pin A width of the extension part may be smaller than a width of the engagement part, the engagement part may have the same width as the through-hole, and the engagement part is configured such that after the engagement part is inserted upward from a lower portion of the through-hole, the engagement part may be moved toward the hook pin in the width direction of the vehicle, and the bottom surface of the engagement part may be hooked and fixed to the through-hole.

The hook pin may include catching hooks protruding from both sides of the slider in a direction perpendicular to the engagement direction, the hook pin accommodation groove may include a catching bump on an inner surface of the hook pin accommodation groove to engage the catching hooks, and when the engagement of the hook pin with the hook body is completed, the catching hooks and the catching bump may engage each other.

The hook assembly may further include a connector extending downward from one end of the base, and a curtain fixing part which may extend from a lower end of the connector to hook and fix an upper end of the door curtain.

DETAILED DESCRIPTION

Figure 1:
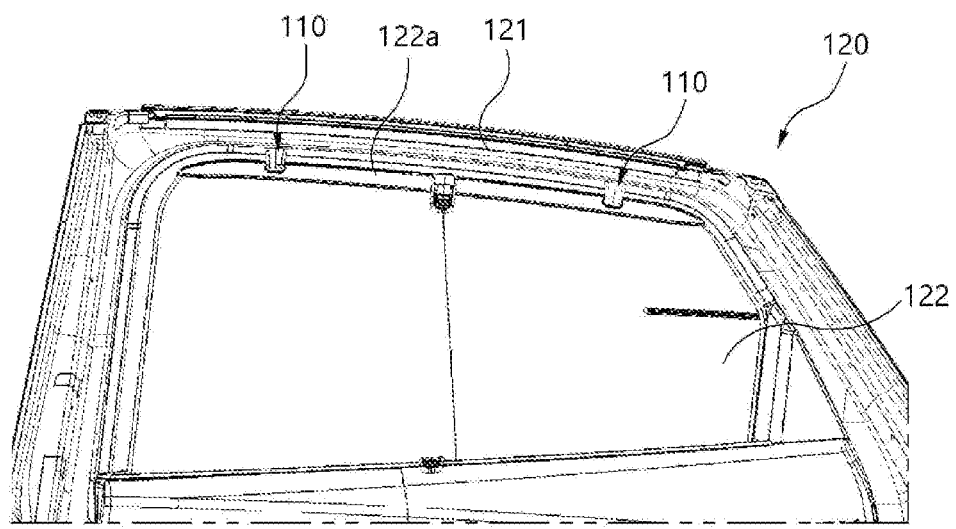
FIG. 1 is a schematic diagram illustrating a state in which a door curtain is installed on a door of a vehicle.
Figure 2:
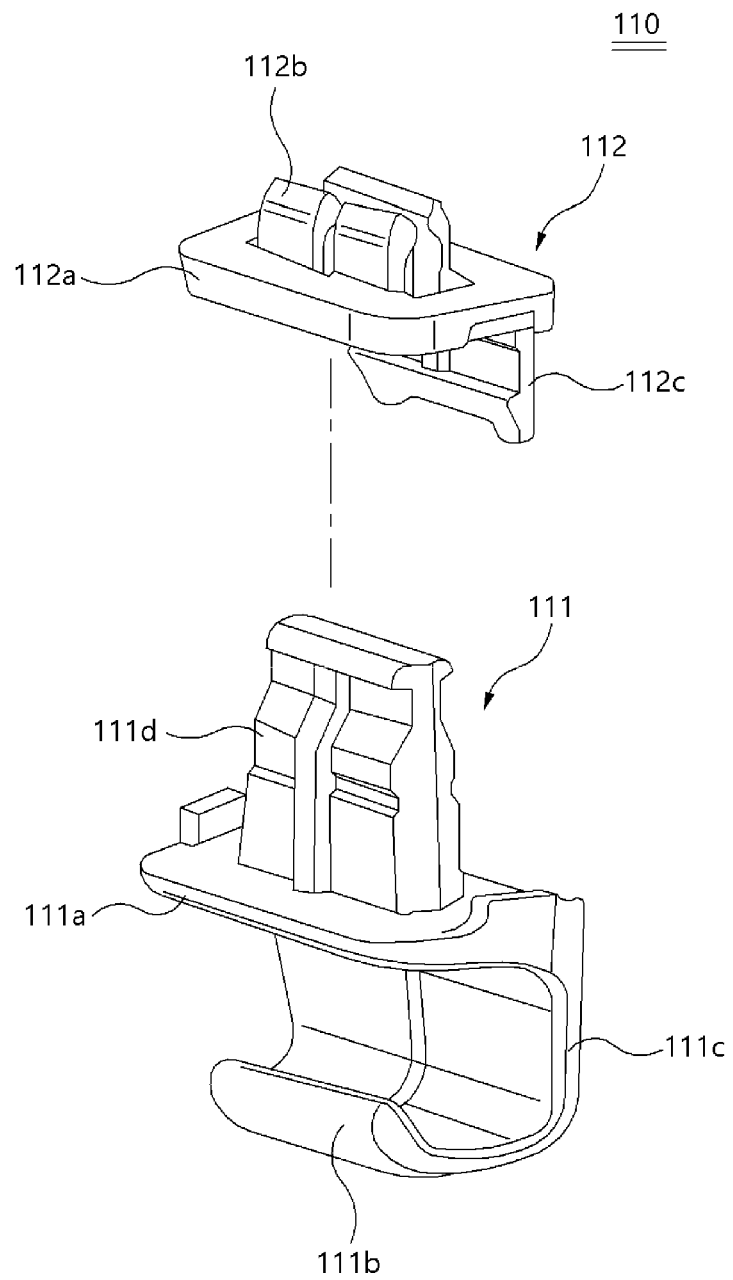
FIG. 2 is an exploded perspective view illustrating a hook assembly according to the related art.
Figure 3A:
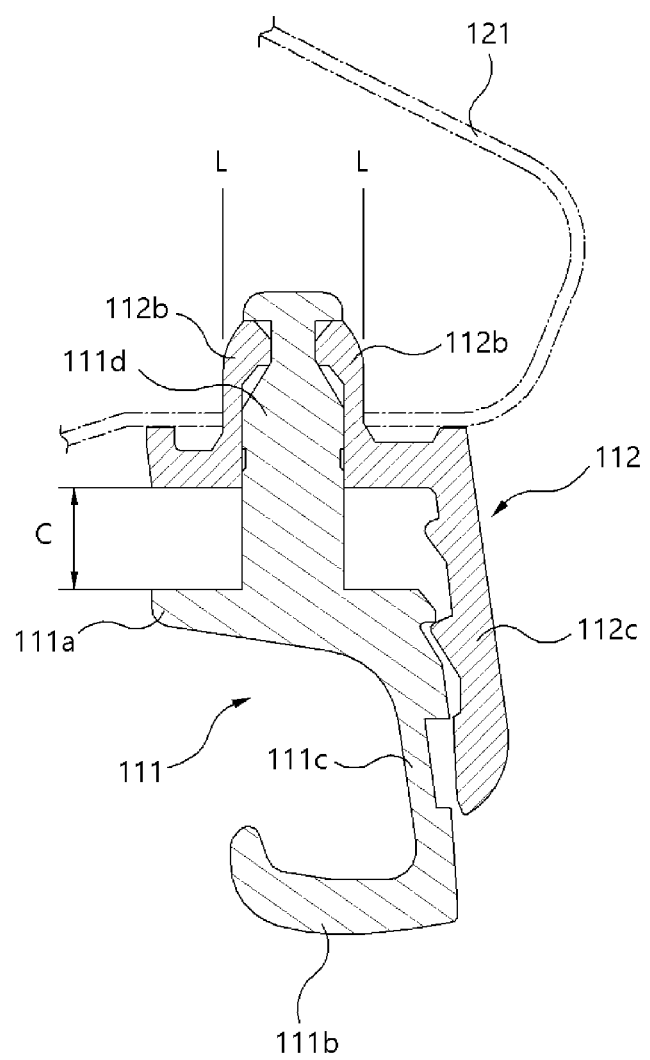
FIG. 3A is a cross-sectional view illustrating a state in which the hook assembly is tentatively assembled with a door according to the related art.
Figure 3B:
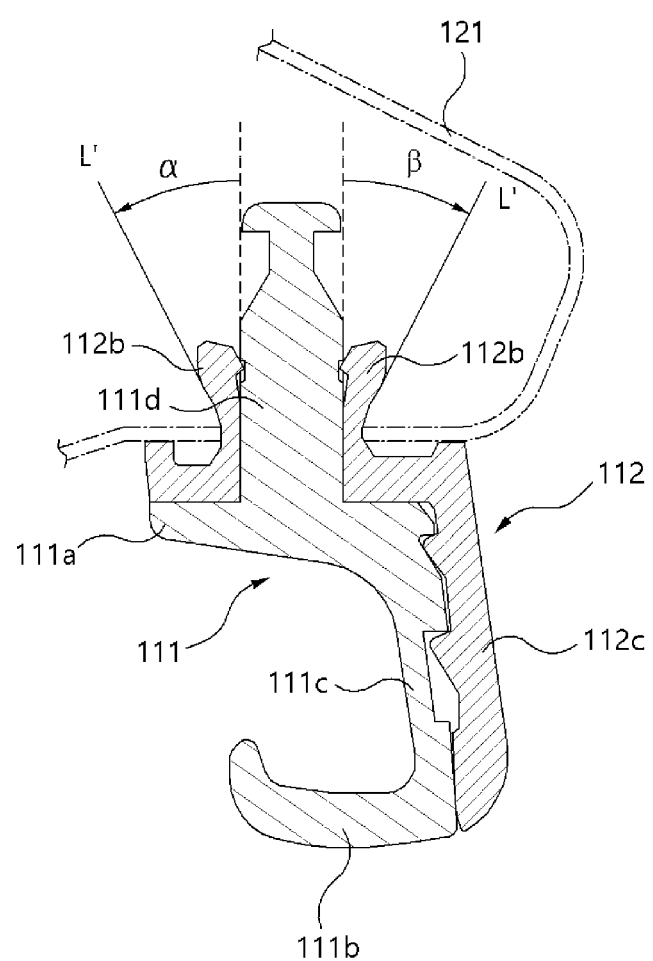
FIG. 3B is a cross-sectional view illustrating a state in which the hook assembly is assembled with the door according to the related art.

Hereinafter, a hook assembly for a door curtain of a vehicle according to the present disclosure will be described in detail with reference to the accompanying drawings. In the drawings, the same reference numbers will be used throughout to designate the same or equivalent elements. In addition, a detailed description of well-known features or functions may not be provided so as to not unnecessarily obscure the gist of the present disclosure. In the following description, a front side of the hook assembly and components therein may correspond to a left side in, for example, FIGS. 5C and 6C, a rear side of the hook assembly and components therein may correspond to a right side in, for example, FIGS. 5C and 6C, an upper portion of the hook assembly and components therein may refer to a top part of, for example, FIGS. 5A and 6A, and a lower (bottom) portion of the hook assembly and components therein may refer to a bottom part of, for example, FIGS. 5A and 6A.

A hook assembly 10 for a door curtain of a vehicle according to the present disclosure may be installed on a door panel 21. A door curtain may be hooked and fixed to the hook assembly 10, which may include a hook body 11 installed to pass through a through-hole 21a formed in the door panel 21 in a load direction (e.g., a height (H) direction of the vehicle) in which the door curtain is applied, and a hook pin 12 engaged with the hook body 11 in a direction (e.g., a width direction of the vehicle) perpendicular to the load direction due to the door curtain. When the hook pin 12 is engaged with the hook body 11, the hook body 11 may be supported in the through-hole 21a in an engaged direction of the hook pin 12 and one side of the hook body 11 may be pressed against a circumference of the through-hole 21a.

The hook body 11 may be inserted into the through-hole 21a formed in the door panel 21 and then may be fixed by the hook pin 12 which will be described below.

Figure 4:
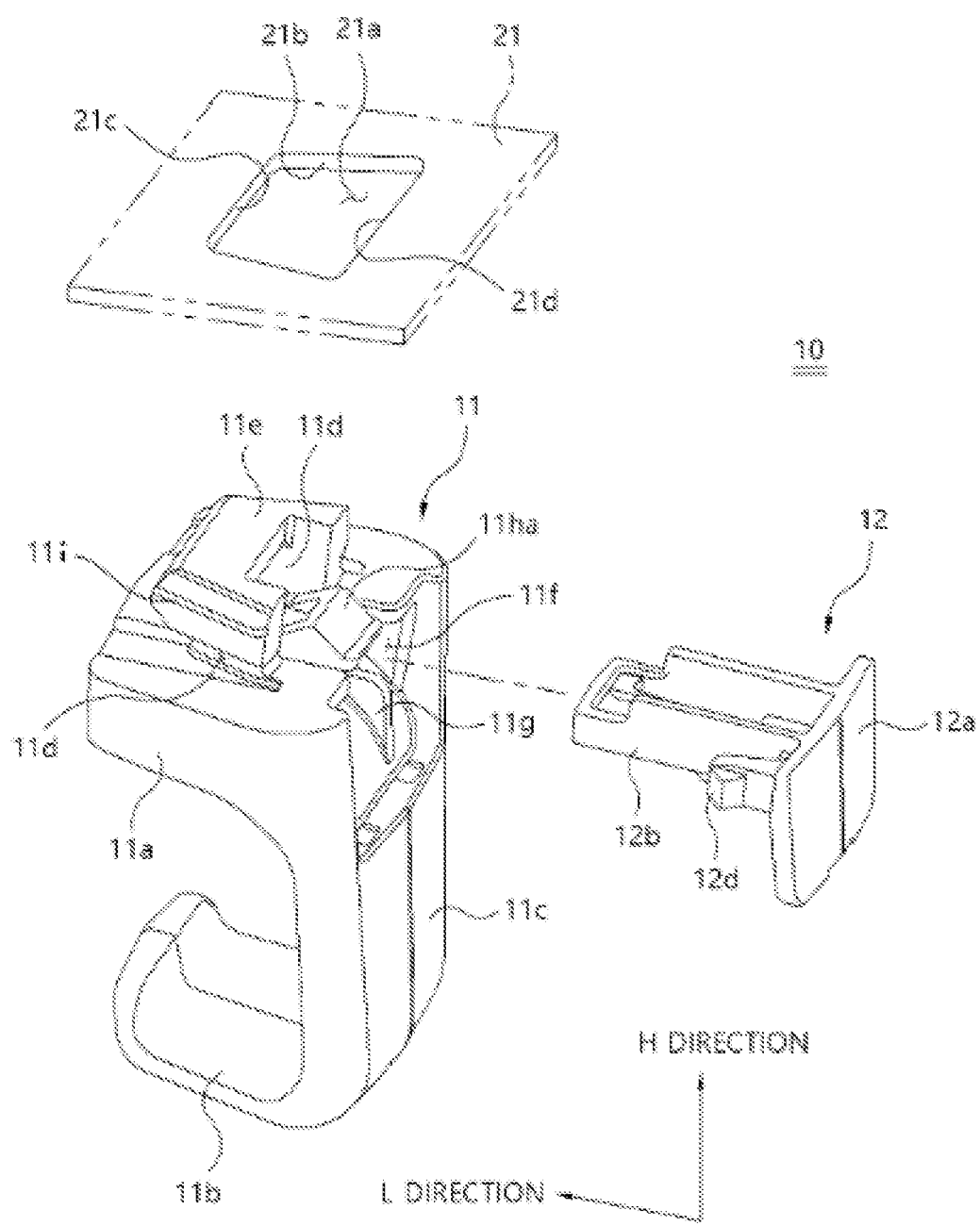
FIG. 4 is an exploded perspective view illustrating a hook assembly for a door curtain of a vehicle according to the present disclosure.

The hook body 11 may include a base 11a being in contact with a bottom surface of the door panel 21, an extension part 11d formed upward from the base 11a and configured to come into contact with an inner circumference of the through-hole 21a, an engagement part 11e which is formed on an upper portion of the extension part 11d and of which a lower circumference 11i may be hooked to the circumference of the through-hole 21a in the door panel 21 to prevent the hook body 11 from being separated from the door panel 21, and an elastic part 11h which is formed to extend from the extension part 11d in a direction opposite the engagement direction (e.g., an L direction in FIG. 4) of the hook pin 12 and of which a rear end may elastically support the hook body 11 in the engagement direction of the hook pin 12.

The base 11a may come into contact with the bottom surface of the door panel 21. Since the base 11a is formed to have a circumference larger than the through-hole 21a, the base 11a may not pass through the through-hole 21a and may be located to come into contact with the bottom surface of the door panel 21.

A curtain fixing part 11b may be located below the base 11a and may fix an upper end of the door curtain. A shade bar installed on the upper end of the door curtain may be hooked to the curtain fixing part 11b, and thus the upper end of the door curtain may be fixed.

A connector 11c may be formed to extend downward from one side of the base 11a. The connector 11c may be formed to extend downward from an end portion of the base 11a located outside the vehicle. The curtain fixing part 11b may be formed to extend toward an interior of the vehicle at a lower end of the connector 11c.

The extension part 11d may be formed to extend upward from the base 11a.

The extension part 11d may be formed such that, when the assembly of the hook assembly 10 is completed, an outer surface of the extension part 11d may come into contact with the inner circumference of the through-hole 21a. The through-hole 21a may be formed to become narrower in an assembly direction of the hook assembly 10, that is, in a direction in which the hook pin 12 is inserted into and engaged with the hook body 11 (e.g., an L direction in FIG. 4), and the extension part 11d may be formed in a shape corresponding to a shape of the through-hole 21a. For example, referring to FIG. 9A, a side contact surface 21b formed on a side surface of the through-hole 21a and the outer surface of the extension part 11d may have a predetermined angle α with respect to an engagement direction (the L direction) of the hook pin 12. Since the outer surface of the extension part 11d is formed to be inclined, as the hook body 11 moves in the engagement direction of the hook pin 12, the hook body 11 may be firmly engaged with the through-hole 21a.

The engagement part 11e may be located on the upper portion of the extension part 11d. The engagement part 11e may be formed to extend upward from the extension part 11d. When the assembly of the hook assembly 10 is completed, a bottom surface of a circumference of the engagement part 11e may be hooked to the circumference of the through-hole 21a so that the engagement part 11e may prevent the hook body 11 from being separated from the door panel 21.

The engagement part 11e may be formed to have a width corresponding to the through-hole 21a. However, since a width of the through-hole 21a may be tapered in the engagement direction, the engagement part 11e may be also formed to have a width which is tapered in the engagement direction. Accordingly, the engagement part 11e may pass through the through-hole 21a in a certain section. However, when the engagement part 11e passes through the through-hole 21a and then the hook pin 12 may be pressed to start engagement, a circumference of the bottom surface of the engagement part 11e may be hooked to the circumference of the through-hole 21a so as to be not moved downward to prevent separation of the hook body 11.

On the other hand, since the width of the engagement part 11e is formed to be greater than the extension part 11d, the extension part 11d may be formed in a neck-shape, thereby restricting a vertical movement of the hook assembly 10, including the hook body 11.

The elastic part 11h may be formed to extend from a front end of the extension part 11d in a direction opposite the engagement direction of the hook pin 12. The elastic part 11h may be formed in the form of a cantilever and a rear end of the elastic part 11h may come into contact with the through-hole 21a, thereby elastically supporting the hook body 11 in the engagement direction of the hook pin 12.

When the hook pin 12 is engaged with the hook body 11 at the rear end of the elastic part 11h, an elastic support 11ha configured to come into contact with a rear contact surface 21d of the through-hole 21a may be formed. The elastic support 11ha may come into contact with the rear contact surface 21d formed on a rear end of the through-hole 21a in the engagement direction. Since an upper surface of the elastic support 11ha is formed as an inclined surface, in a state in which the elastic support 11ha comes into contact with the rear contact surface 21d, the elastic support 11ha may move forward the elastic part 11h in the engagement direction. Accordingly, the front end of the extension part 11d may support the hook body 11 to be moved toward the front contact surface 21c formed on a front end of the through-hole 21 in the engagement direction. In particular, until a side surface of the extension part 11d comes into contact with the side contact surface 21b formed on the side surface of the through-hole 21a, the elastic part 1h may elastically support the front end of the extension part 11d to be moved toward the front contact surface 21c of the through-hole 21a. According to the above configuration, even when there may be slight variations in the through-hole 21a due to its manufacturing process, since the hook body 11 is moved as close as possible toward an inside of the through-hole 21a, that is, the front contact surface 21c, thus the outer surface of the extension part 11d may come into contact with the side contact surface 21b, and therefore an engagement force is applied consistently and is increased. As described above, when compared to the conventional hook assembly, since the engagement force is increased, an extraction force required to separate the hook assembly 110 from the door panel 121 may be also increased, the hook assembly 110 may be prevented from being separated.

A fixing bump 11hb may be formed on the bottom surface of the elastic part 1h and may be configured to allow a movement of the hook pin 12 when the hook pin 12 is engaged and to restrict the movement in a separation direction. When the hook pin 12 is engaged with the hook body 11 by the fixing bump 11hb, the hook pin 12 may be prevented from being separated.

The hook pin 12 may be inserted into and engaged with the hook body 11 in the width direction (the L direction) of the vehicle, thereby maintaining the hook body 11 in an engagement state without being separated from the through-hole 21a.

When the engagement of the hook pin 12 with the hook body 11 is completed, the hook body 11 may be pressed against in the engagement direction of the hook pin 12 in the through-hole 21a, and thus one side of the hook body 11 may be pressed against an inner circumference of the through-hole 21a. That is, the outer surface of the extension part 11d may be pressed against the side contact surface 21b of the through-hole 21a.

To this end, the hook pin 12 may include a press part 12a that is pressed to engage the hook pin 12 with the hook body 11, a slider 12b formed to extend from the press part 12a in the engagement direction of the hook pin 12 and inserted into a hook pin accommodation groove 11f formed in the hook body 11, and a fixing support 12c formed at a predetermined length from a front end of the slider 12b toward the press part 12a and configured to support the bottom surface of the elastic part 11h when the hook pin 12 is engaged with the hook body 11.

The press part 12a may be pressed by an operator, and thus the hook pin 12 is inserted into the hook body 11 to be engaged therewith.

The slider 12b may be formed to extend from the press part 12a in the engagement direction. A hook pin accommodation groove 11f may be formed in the hook body 11 to be inserted into and engaged with the hook pin 12, and the slider 12b may be inserted into the hook pin accommodation groove 11f. In addition, since the slider 12b is formed in the engagement direction, the slider 12b may be stably inserted into the hook pin accommodation groove 11f.

A stopper 12ba may be formed on the front end of the slider 12b to prevent the hook pin 12 from being moved backward (rearward) when the hook pin 12 is tentatively engaged with the hook body 11. The fixing bump 11hb formed on the bottom surface of the elastic part 11h may include an inclined surface 11hc configured to allow the stopper 12ba to pass therethrough when the hook pin 12 is engaged with the hook body 11, and a stop surface 11hd configured to prevent the hook pin 12 from being moved backward after the hook pin 12 is engaged with the hook body 11. Accordingly, the stopper 12ba may be moved along the inclined surface in the engagement direction to cross the fixing bump 11hb and may be hooked to the stop surface 11hd and may not cross the fixing bump 11hb in a direction opposite the engagement direction, thereby preventing the hook pin 12 from being separated.

The fixing support 12c may be formed from the front end of the slider 12b in the direction opposite the engagement direction. While the hook pin 12 is engaged with the hook body 11, the fixing support 12c may be spaced apart from the elastic part 11h to facilitate the engagement of the hook pin 12. In addition, when the engagement of the hook pin 12 with the hook body 11 is completed, the bottom surface of the elastic part 11h may be elastically supported to allow the hook pin 12 to be firmly engaged. To this end, a support block 12ca may be formed on a rear end of the fixing support 12c, and a support block accommodation groove flab configured to accommodate the support block 12ca may be formed on an inner surface of the base 11a in the hook body 11. The support block 12ca may be accommodated in the support block accommodation groove 11ab until the engagement of the hook pin 12 with the hook body 11 is completed, thereby facilitating the engagement of the hook pin 12. On the other hand, when the engagement of the hook pin 12 with the hook body 11 is completed, the support block 12ca may be separated from the support block accommodation groove 11ab and may press the bottom surface of the elastic part 11h to support the elastic part 11h upward. When the engagement of the hook pin 12 with the hook body 11 is completed, a bottom surface of the support block 12ca may be supported on a bottom surface of the hook pin accommodation groove 11f to allow the fixing support 12c to support the elastic part 11h without being drooped downward.

When the engagement of the hook pin 12 with the hook body 11 is completed, a bottom surface of the hook pin 12 may be supported on a hook pin support groove 11g formed at an entrance of the hook pin accommodation groove 11f.

On the other hand, a catching hook 12d and a catching bump 11aa may be formed to prevent the hook pin 12 from being moved backward and separated when the engagement of the hook pin 12 with the hook body 11 is completed. In the hook pin 12, the catching hook 12d protruding in a direction perpendicular to the engagement direction of the hook pin 12 may be formed on both sides of the slider 12b, and in the hook body 11, the catching bump 11aa engaged with the catching hook 12d may be formed on an inner surface of the hook pin accommodation groove 11f. Thus, when the engagement of the hook pin 12 with the hook body 11 is completed, the catching hook 12d and the catching bump 11 as may be engaged with each other, thereby preventing the hook pin 12 from being separated.

A process of engaging the hook body 11 with the hook pin 12 is shown in FIGS. 5A to 7C.

Figure 5A:
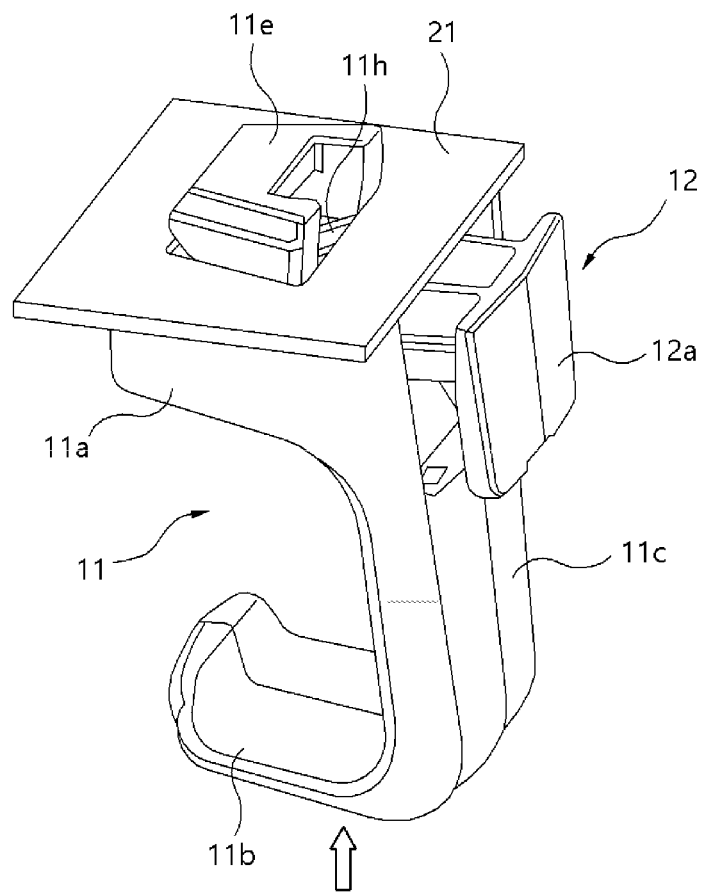
FIGS. 5A and 5B are each a perspective view and a plan view, both of which illustrate the hook assembly inserted into a panel so as to assemble the hook assembly for a door curtain of a vehicle according to the present disclosure.
Figure 5B:
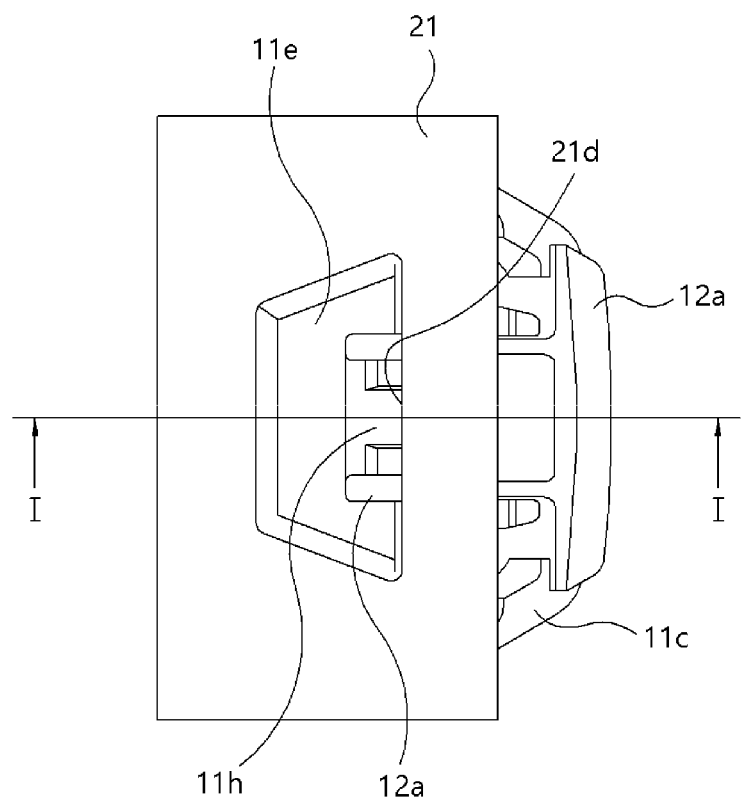
Figure 5C:
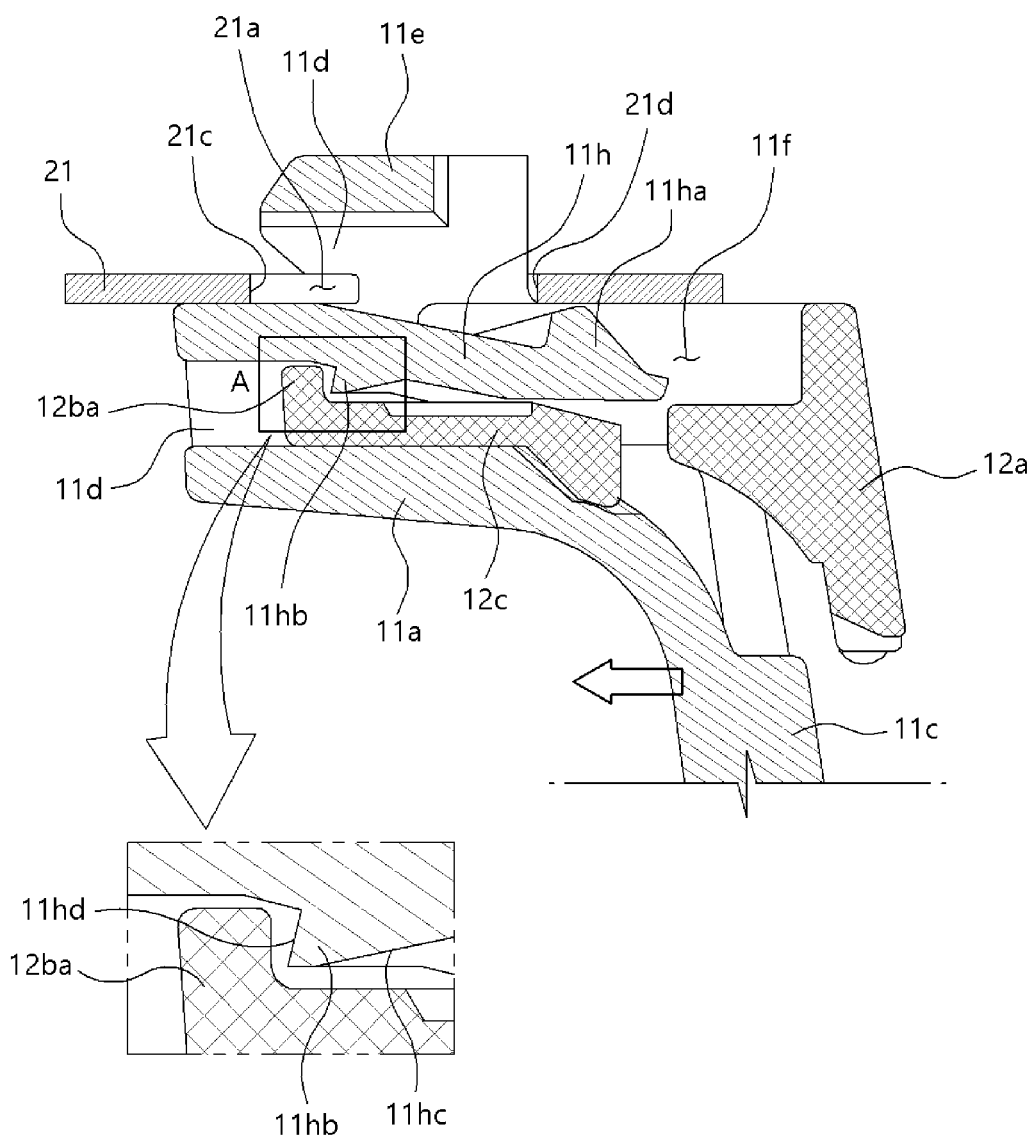
FIG. 5C is a cross-sectional view taken along line I-I of FIG. 5B.

In FIGS. 5A to 5C, an initial state for engaging the hook assembly 10 is shown.

In a state in which the hook pin 12 is tentatively engaged with the hook body 11, the hook body 11 may be inserted into the through-hole 21a in the height direction of the vehicle (the H direction). The engagement part 11e in the hook body 11 may be in a state of passing through the through-hole 21a, and the hook body 11 may be in a state of being not engaged with the door panel 21.

The elastic support 11ha in the hook body 11 may be in a state of being pressed by the bottom surface of the door panel 21, and the support block 12ca in the hook pin 12 may be in a state of being accommodated in the support block accommodation groove 11ab.

In addition, the hook pin 12 may be in a tentative engagement state, and since the stopper 12ba passes through the fixing bump 11hb, the hook pin 12 is not separated from the hook body 11.

Figure 6A:
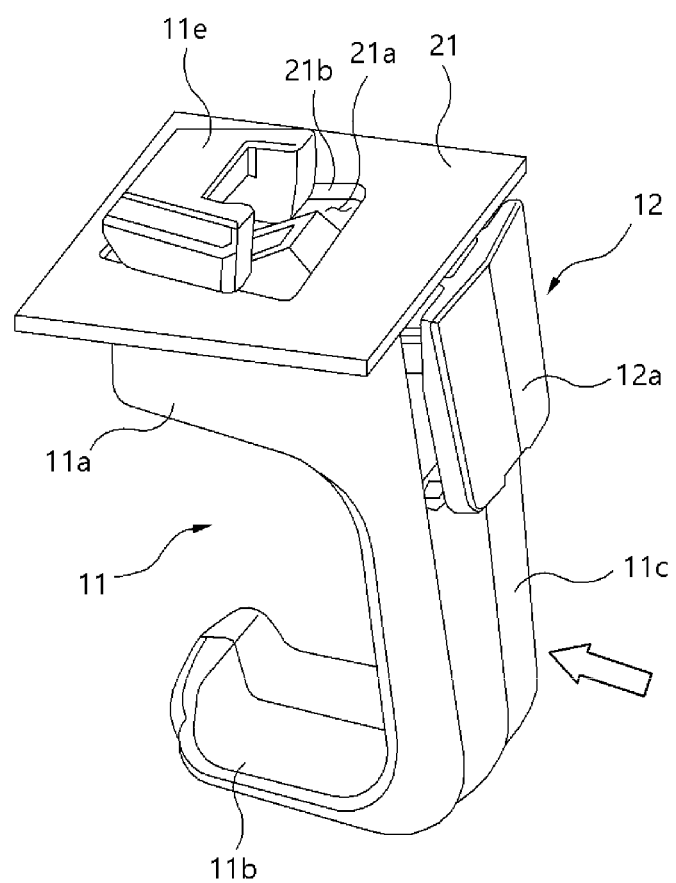
FIGS. 6A and 6B are each a perspective view and a plan view, both of which illustrate a state in which a hook pin is inserted into the hook assembly for a door curtain of a vehicle according to the present disclosure.
Figure 6B:
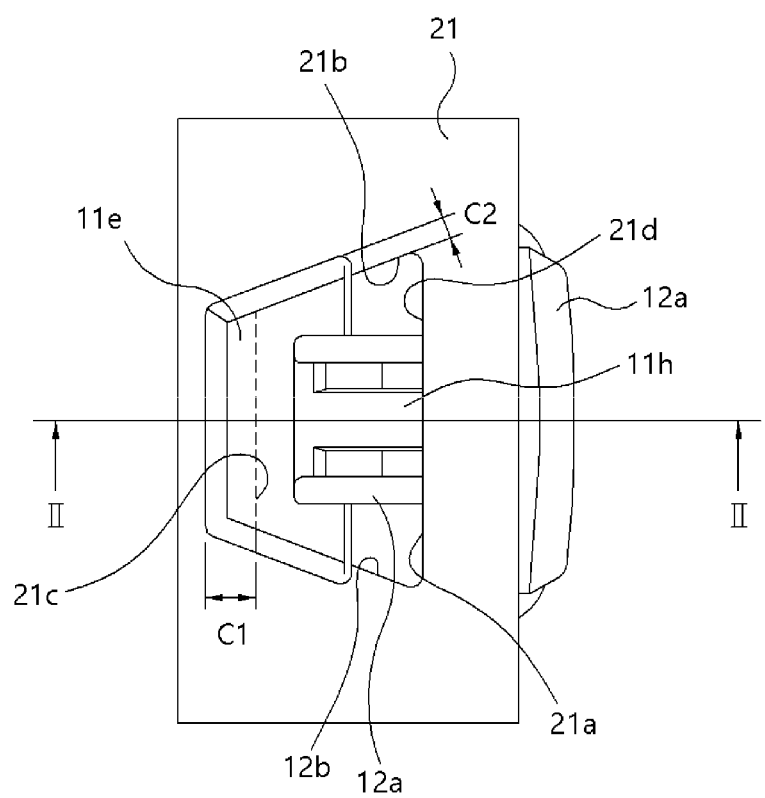
Figure 6C:
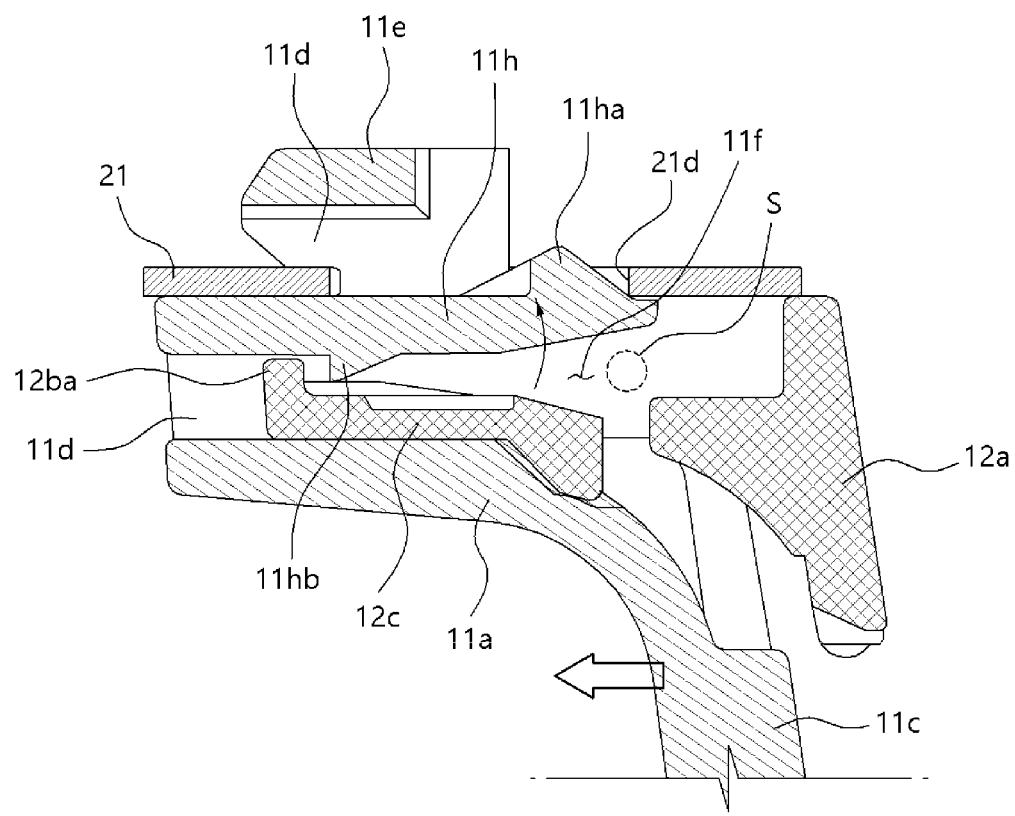
FIG. 6C is a cross-sectional view taken along line □-□ of FIG. 6B.

In FIGS. 6A to 6C, a state in which a portion of the hook body 11 is moved forward is shown.

When the hook body 11 is moved forward, the extension part 11d may become close to the side contact surface 21b as the hook body 11 is moved forward. Since the hook pin accommodation groove 11f is formed in the hook body 11, the hook pin accommodation groove 11f may be used as a space S in which the elastic support 11ha may be located during the engagement process so that, when the hook body 11 is moved forward, resistance is reduced.

In addition, as regions shown by C1 and C2 in FIG. 6B, the bottom surface of the engagement part 1e may overlap the circumference of the through-hole 21a to prevent the hook body 11 from being moved downward.

Figure 7A:
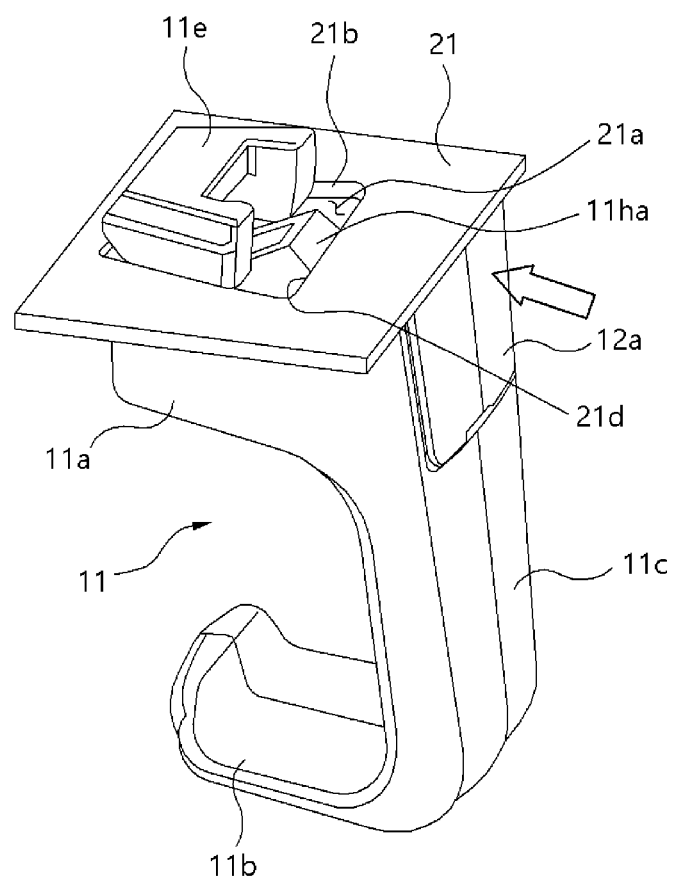
FIGS. 7A and 7B are each a perspective view and a plan view, both of which illustrate an assembly completion state of the hook assembly for a door curtain of a vehicle according to the present disclosure.
Figure 7B:
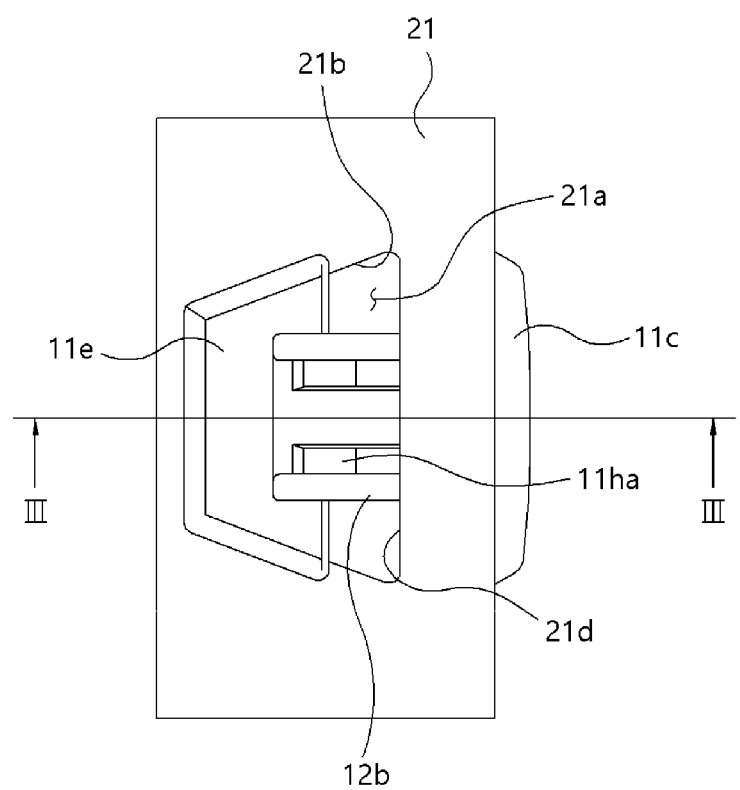
Figure 7C:
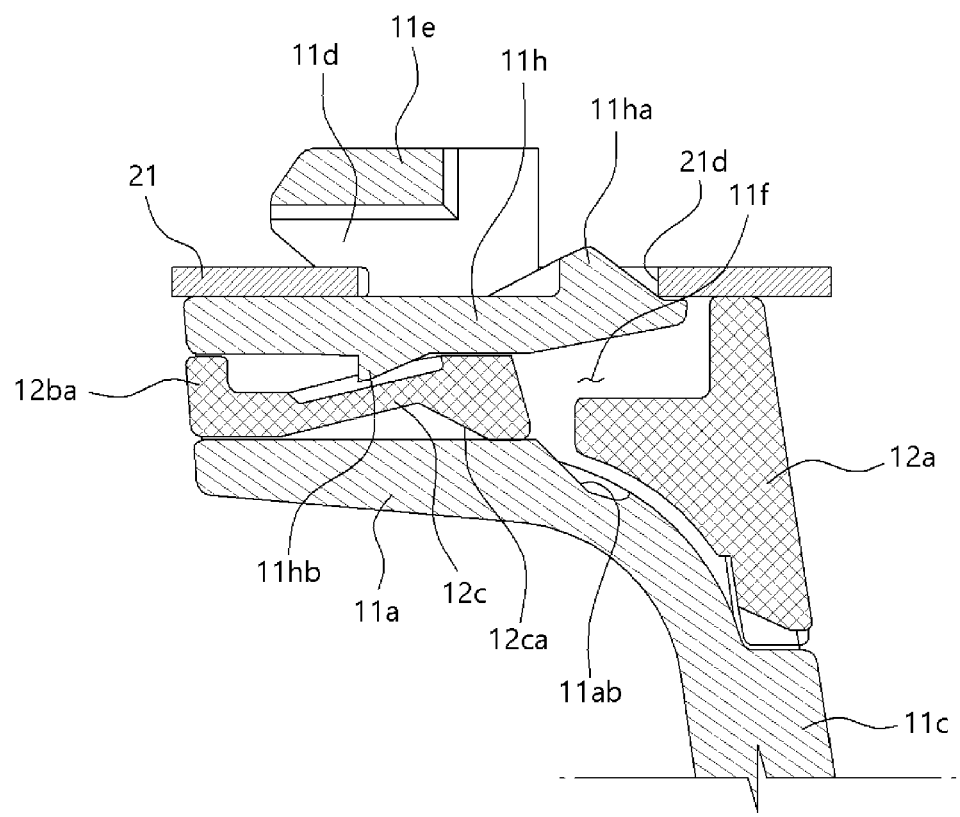
FIG. 7C is a cross-sectional view taken along line □-□ of FIG. 7B.

FIGS. 7A to 7C illustrate a state in which the assembly of the hook assembly 10 is completed.

When the hook pin 12 is moved forward, the fixing support 12c may be moved forward, and thus the support block 12ca may be separated from the support block accommodation groove 11ab. The bottom surface of the support block 12ca may be supported on the hook pin accommodation groove 11f, and the upper surface of the support block 12ca may support the bottom surface of the elastic part 11h. Accordingly, the elastic support 11ha may be maintained at a state of contacting the rear contact surface 21d. Since the elastic support 11ha is formed in an inclined surface, the elastic support 11ha may support consistently and elastically the hook body 11 in a direction of being moved forward.

Figure 8:
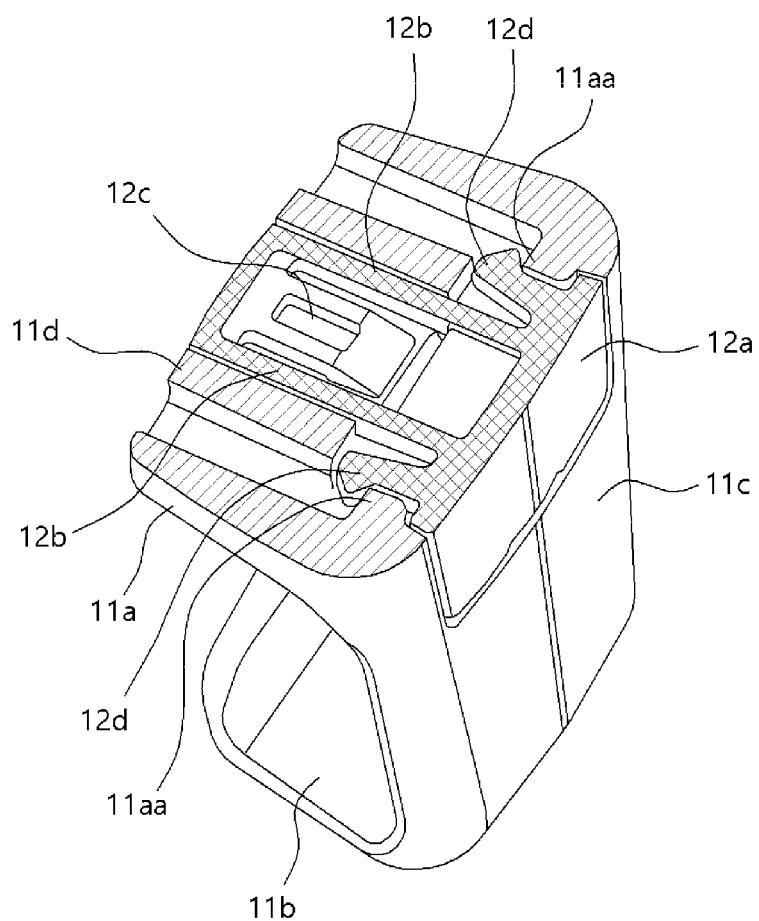
FIG. 8 is a cutaway perspective view illustrating a state in which an upper portion of the hook assembly for a door curtain of a vehicle is incised according to the present disclosure.

In addition, when the assembly of the hook assembly 10 is completed, the catching hook 12d and the catching bump 11as may be engaged with each other, thereby preventing the hook pin 12 from being separated from the hook body 11 (see FIG. 8).

In FIGS. 9A to 11B show the assembly of the hook assembly 10 and a through-hole 21a having slight variations in the dimensions.

Figure 9A:
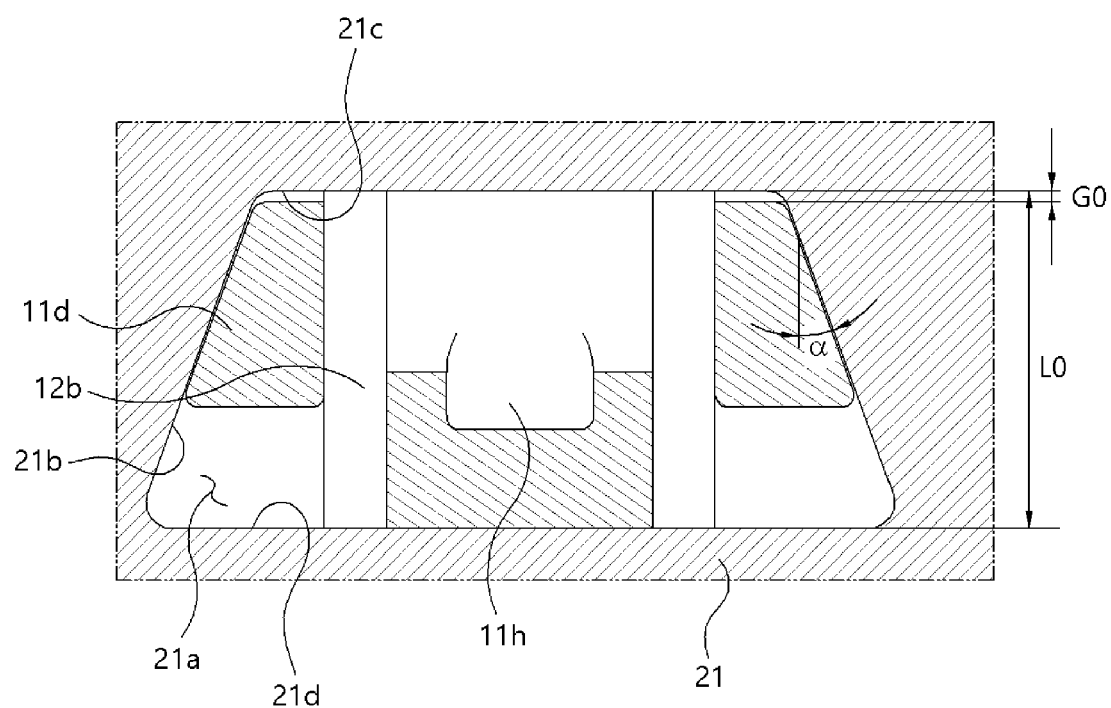
FIGS. 9A and 9B are cross-sectional views illustrating an assembly state in which a through-hole is machined, with a correct size, in a panel with which the hook assembly for a door curtain of a vehicle is engaged according to the present disclosure.
Figure 9B:
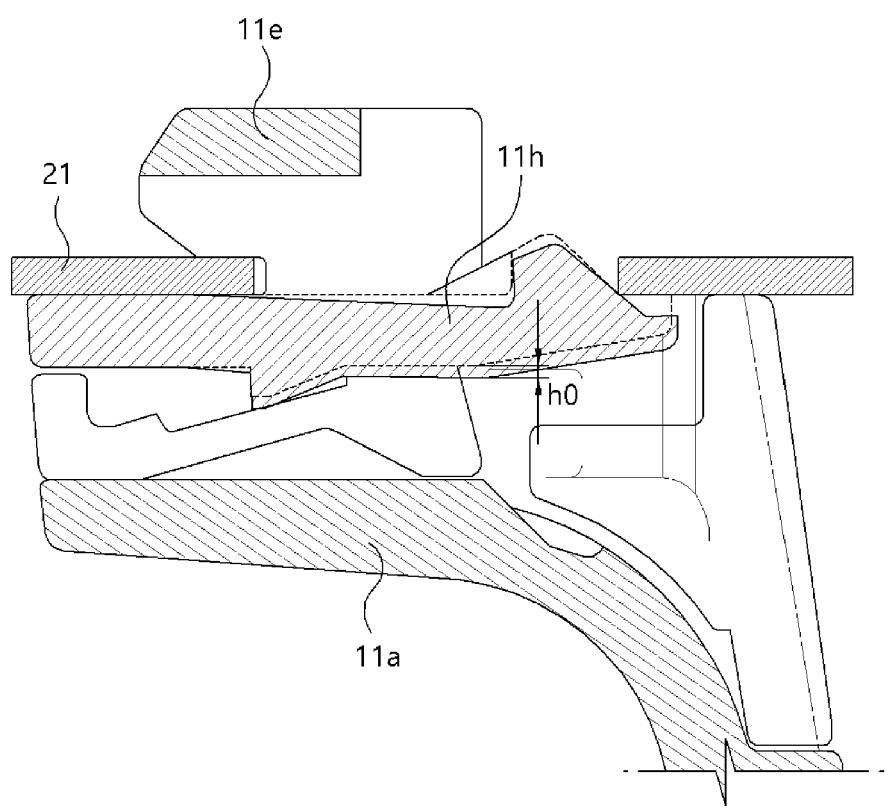

FIGS. 9A and 9B show a state in which the through-hole 21a may be machined at a pre-determined size. When a length L0 of the through-hole 21a is machined at a pre-determined size, an appropriate gap G0 may be formed between the front end of the extension part 11d and the front contact surface 21c, and the bottom surface of the elastic part 11h and the support block 12c a may overlap at an appropriate size (h0).

Figure 10A:
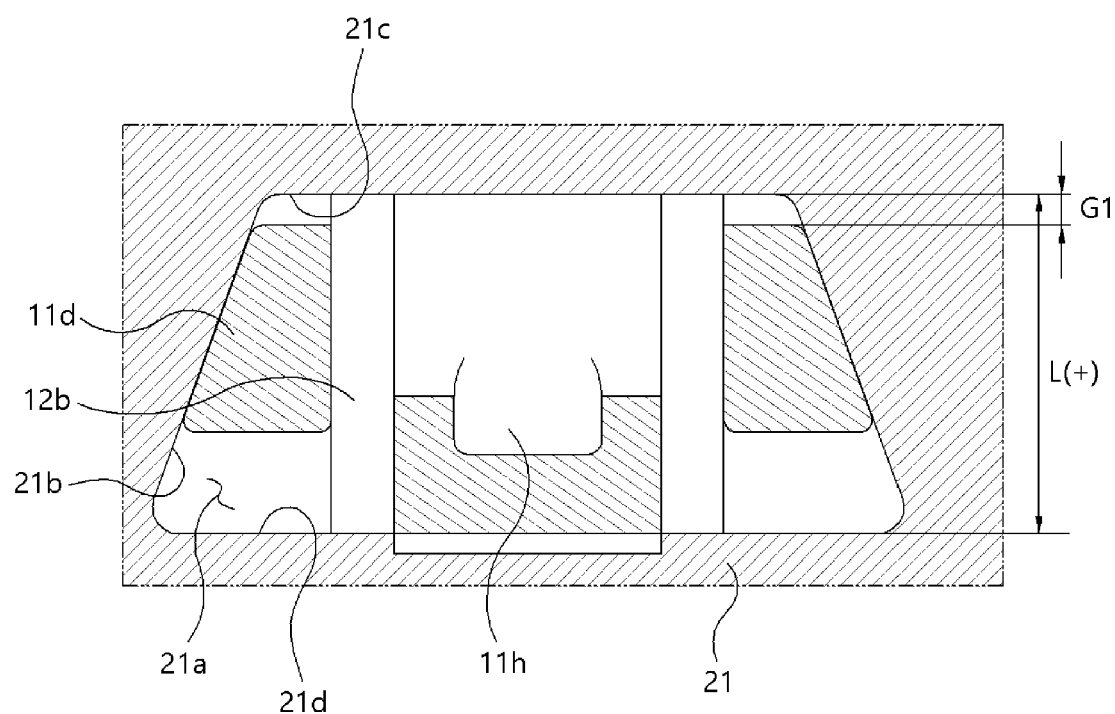
FIGS. 10A and 10B are cross-sectional views illustrating an assembly state in which a through-hole is machined, with a size that is smaller than the correct size, in the panel with which the hook assembly for a door curtain of a vehicle is engaged according to the present disclosure.
Figure 10B:
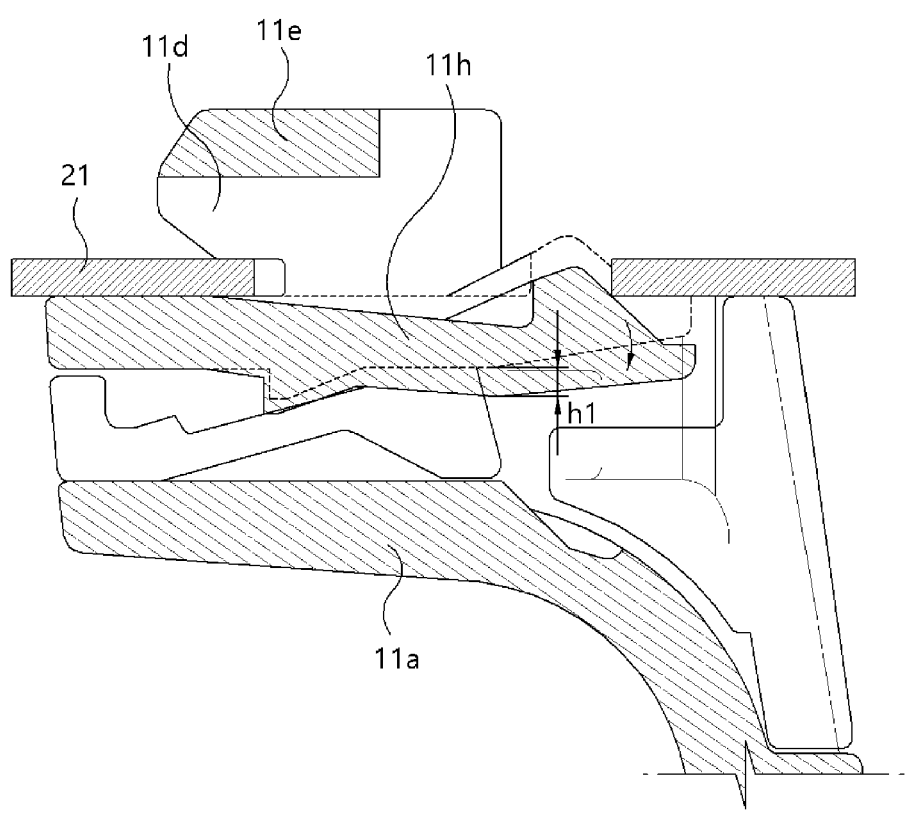

FIGS. 10A and 10B show a state in which the through-hole 21a is machined at a size that is greater than the pre-determined size. Even when a length L (+) of the through-hole 21a is machined at a size that is greater than the pre-determined size, the hook body 11 may be elastically supported toward the front contact surface 21c, thereby applying a consistent engagement force. Although a gap G1 between the front end of the extension part 11d and the front contact surface 21c may be increased and the overlap h1 between the bottom surface of the elastic part 11h and the support block 12c a may be also increased, the outer surface of the extension part 11d may come into contact with the side contact surface 21b to absorb a tolerance, and a firm engagement force may be maintained.

Figure 11A:
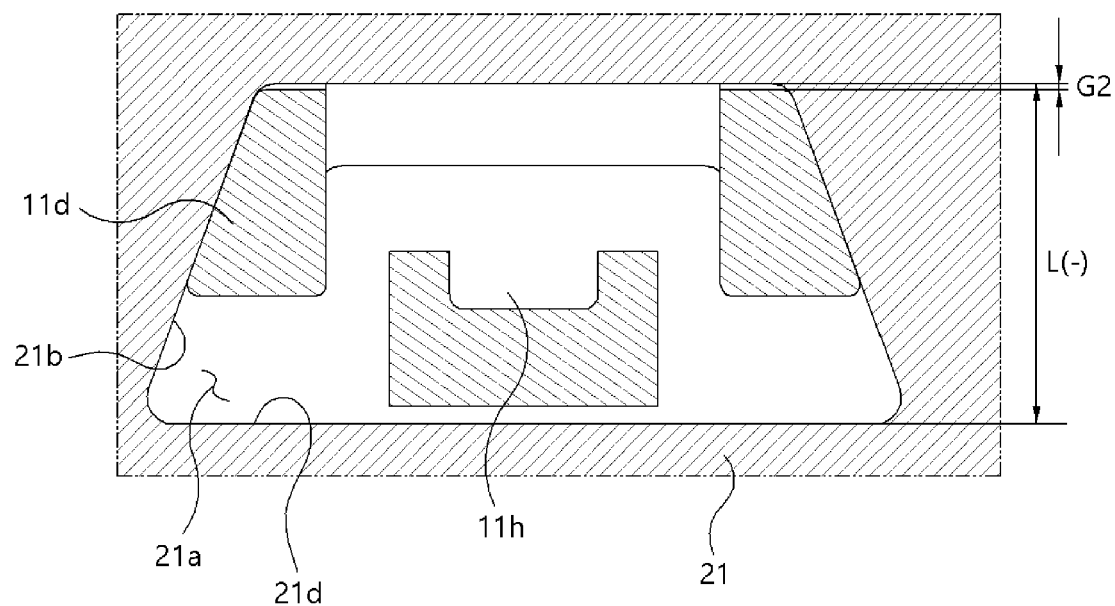
FIGS. 11A and 11B are cross-sectional views illustrating an assembly state in which a through-hole is machined, with a size that is greater than the correct size, in the panel with which the hook assembly for a door curtain of a vehicle is engaged according to the present disclosure.
Figure 11B:
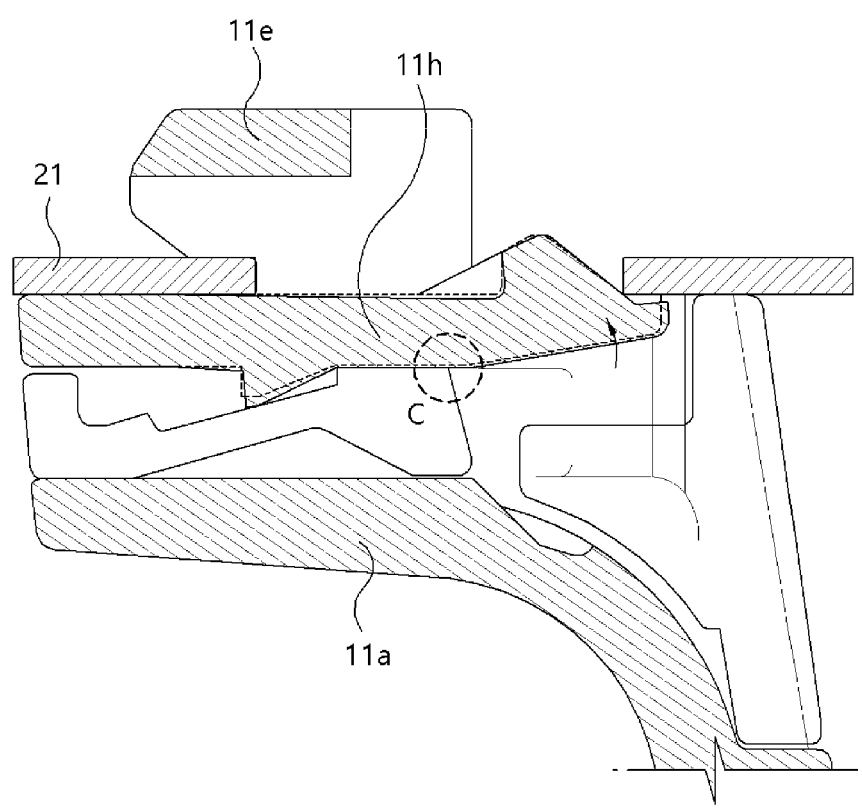

Meanwhile, in FIGS. 11A and 11B, a state in which the through-hole 21a may be machined at a size that is smaller than the pre-determined size. Even when a length L(−) of the through-hole 21a is machined at a size that is smaller than the pre-determined size, the outer surface of the extension part 11d may come into contact with the side contact surface 21b to absorb a tolerance. In this case, a gap G2 between the front end of the extension part 11d and the front contact surface 21c may be decreased, and the overlap h1 between the bottom surface of the elastic part 11h and the support block 12ca may be decreased or the bottom surface of the elastic part 11h may maintain a contacting state with the support block 12ca (see portion C of FIG. 11b).

In accordance with a hook assembly for a door curtain of a vehicle according to the present disclosure, which has the above-described configuration, since an engagement force of the hook assembly is applied in a width direction of the vehicle and a load due to a door curtain to the hook assembly is applied in a vertical direction of the vehicle, assembly of the hook assembly may be facilitated.

In addition, since the engagement force is applied in the width direction of the vehicle and the load is applied in the vertical direction of the vehicle, it is possible to prevent the hook assembly from being separated from the door panel or from being damaged during use.

In addition, even when slight variations occur in a through-hole of the door panel, with which the hook assembly is engaged, during a machining process, the hook body is pressed against one side surface of the through-hole, and thus assembly defects may be prevented due to a distribution in size of the through-hole. While the present disclosure has been described with reference to the accompanying drawings, it will be apparent to those skilled in the art that various changes and modifications may be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A hook assembly for a door curtain of a vehicle, the hook assembly is to be installed on a door panel and hooked and fixed to the door curtain, the hook assembly comprising:
    a hook body to be installed to pass through a through-hole formed in the door panel in a load direction in which the door curtain is applied; and
    a hook pin to engage the hook body in an engagement direction that is perpendicular to the load direction,
    wherein, when the hook pin is engaged with the hook body, one side of the hook body is pressed against a circumference of the through-hole while supporting the hook body in the through-hole in the engagement direction.

2. The hook assembly of claim 1, wherein the hook body includes:
    a base to come into contact with a bottom surface of the door panel;
    an extension part formed upward from the base to come into contact with an inner circumference of the through-hole when the engagement of the hook pin is completed;
    an engagement part on an upper portion of the extension part, wherein a lower circumference of the engagement part is hooked to the circumference of the through-hole when the engagement of the hook pin is completed to prevent the hook body from being separated from the door panel; and
    an elastic part extending from the extension part in a direction opposite the engagement direction, wherein the elastic part includes a rear end to support the hook body in the engagement direction.

3. The hook assembly of claim 2, wherein:
the engagement part has a width that tapers in the engagement direction, and
the extension part has a side surface to come into contact with a side contact surface of the through-hole.

4. The hook assembly of claim 2, wherein an outer surface of the extension part is inclined at a predetermined angle with respect to the engagement direction.

5. The hook assembly of claim 2, wherein the rear end of the elastic part includes an elastic support to come into contact with a rear contact surface of the through-hole when the engagement of the hook pin with the hook body is completed.

6. The hook assembly of claim 5, wherein the elastic support is an inclined surface to support the hook body to be moved toward a front contact surface of the through-hole at a front end of the extension part.

7. The hook assembly of claim 5, wherein, until an outer surface of the extension part comes into contact with a side contact surface formed on a side surface of the through-hole, the elastic support elastically supports the hook body to allow the front end of the extension part to be moved toward a front contact surface of the through-hole.

8. The hook assembly of claim 2, wherein the hook pin includes:
a press part to engage the hook pin with the hook body;
a slider extending from the press part in the engagement direction and inserted into a hook pin accommodation groove in the hook body; and
a fixing support extending for a predetermined length from a front end of the slider toward the press part to support a bottom surface of the elastic part when the hook pin is engaged with the hook body.

9. The hook assembly of claim 8, wherein the elastic part includes a fixing bump on the bottom surface of the elastic part to prevent the hook pin from being moved rearward so as to prevent the hook pin from being separated when the hook pin is engaged with the hook body.

10. The hook assembly of claim 9, wherein the slider includes a stopper on a front end of the slider to be hooked and fixed to the hook pin when the hook pin is engaged with the hook body.

11. The hook assembly of claim 10, wherein the fixing bump includes:
an inclined surface to allow the stopper to pass therethrough when the hook pin is engaged with the hook body; and
a stop surface to prevent a rearward movement of the hook pin after the hook pin is engaged with the hook body.

12. The hook assembly of claim 8, wherein:
the fixing support includes a support block on a rear end of the fixing support to support the bottom surface of the elastic part when the engagement of the hook pin with the hook body is completed;
the hook body includes a support block accommodation groove on an inner surface of the base to accommodate the support block; and
the support block is accommodated in the support block accommodation groove until the engagement of the hook pin with the hook body is completed, and when the engagement of the hook pin with the hook body is completed, the support block is separated from the support block accommodation groove to support the bottom surface of the elastic part.

13. The hook assembly of claim 12, wherein, when the engagement of the hook pin with the hook body is completed, a bottom surface of the support block is supported on a bottom surface of the hook pin accommodation groove.

14. The hook assembly of claim 8, wherein the hook pin accommodation groove includes a hook pin support groove at an entrance of the hook pin accommodation groove to support the bottom surface of the hook pin.

15. The hook assembly of claim 2, wherein:
a width of the extension part is smaller than a width of the engagement part;
the engagement part has the same width as the through-hole; and
after the engagement part is inserted upward from a lower portion of the through-hole, the engagement part is moved toward the hook pin in the width direction of the vehicle, and the bottom surface of the engagement part is hooked and fixed to the through-hole.

16. The hook assembly of claim 8, wherein:
the hook pin includes catching hooks protruding from both sides of the slider in a direction perpendicular to the engagement direction;
the hook pin accommodation groove includes a catching bump on an inner surface of the hook pin accommodation groove to engage the catching hooks; and
when the engagement of the hook pin with the hook body is completed, the catching hooks and the catching bump engage each other.

17. The hook assembly of claim 2, further comprising:
a connector extending downward from one end of the base; and
a curtain fixing part which extends from a lower end of the connector to hook and fix an upper end of the door curtain.

* * * * *